United States Patent Office 2,878,176
Patented Mar. 17, 1959

2,878,176

METHOD FOR ISOMERIZING POLYBUTADIENE

Morton A. Golub, Cuyahoga Falls, Ohio, assignor to The B. F. Goodrich Company, New York, N. Y., a corporation of New York No Drawing. Application December 31, 1956
Serial No. 631,459

4 Claims. (Cl. 204—162)

This invention relates to a method for isomerizing cis 1,4-structures in polybutadiene to trans 1,4-structures. The invention relates more specifically to the photoisomerization of cis 1,4-structures in polybutadiene to trans 1,4-structures by exposing a solution of a polybutadiene possessing cis 1,4-structures and an organic bromine compound to ultra-violet radiation.

When butadiene-1,3 is normally polymerized the butadiene monomers unite in both 1,4- and 1,2-structures, and in the 1,4-double bond units both cis and trans configurations occur. It is known however that butadiene may be polymerized by means of certain heavy metal oxide and heavy metal organo-metallic catalysts to produce polymers containing varying proportions of 1,4-structures in cis configurations. It has now been discovered, quite unexpectedly, that polybutadienes containing more than about 10% cis 1,4-structures may be photoisomerized and the cis structures in excess of about 10% converted into trans 1,4-structures. The process is readily controlled to obtain a degree of conversion as desired. In essence the process comprises exposing a solution of a polybutadiene containing more than about 10% cis 1,4-structures and an organic bromine compound to ultra-violet radiation. Quite unexpectedly, during such exposure the cis 1,4-units in excess of about 10% are converted to trans 1,4-units. The process is effective so long as there is some polybutadiene which possesses more than about 10% cis 1,4-structures dissolved in the solvent in the presence of an organic bromine compound which is also at least partially soluble in the solvent and this mixture exposed to ultra-violet radiation.

The process of this invention is applicable to any polybutadiene regardless of how prepared which contains more than about 10% cis 1,4-structures containing olefinic double bonds. Ordinarily, emulsion polymerized polybutadienes contain a very low concentration of cis structures and are not as efficiently employed in the process of the invention as are the polybutadienes prepared with, for example, heavy metal organo-metallic catalysts which may result in polymers containing large amounts of cis 1,4-structures, often as high as about 95%.

Apparently any organic bromine compound is effective in the photoisomerization reaction. All of the following listed materials have been found to be useful in converting cis 1,4-structures to trans 1,4-structures in polybutadiene: t-butyl bromide, p-dibromobenzene, bromocyclohexane, dibromobutane, propylene bromide, bromobenzene, isopropyl bromide, acetyl bromide, bromotoluene, bromonaphthylene, n-amyl bromide, heptyl bromide, ethyl bromide, bromacetyl bromide, benzoyl bromide, 1,2,3-tribromopropane, trimethylene bromide, ethylene bromide, sym.-tetrabromoethane, bromoaniline, allyl bromide, bromoform, carbon tetrabromide, tribromo phenol, beta-bromostyrene, dibromobutene, para-bromobenzoic acid, isobutylene bromide, alphabutylene bromide, bromoacetic acid, bromobenzoyl bromide, bromocyclohexane, 1,3-dibromo-5,5-dimethyl hydantoin and p-chlorobromobenzene. Mixtures of these materials may be employed.

While all the above listed organic compounds were found to effect the photoisomerization of cis to trans structures in polybutadiene, some of these materials are more efficient than others and smaller amounts and shorter reaction times may be employed with the more effective materials. For example, carbon tetrabromide, bromobenzoyl bromide, bromacetyl bromide, benzoyl bromide, allyl bromide, tertiary-butyl bromide, dibromobutane, ethylene bromide, and 1,2,3-tribromopropane are quite efficient, carbon tetrabromide being the most efficient material tested. Very efficient conversions are obtained when, for example, the polybutadiene is dissolved in bromobenzene and carbon tetrabromide or t-butyl bromide are also employed in the solution. Bromine itself is effective in the process of this invention if used in only trace amounts, that is, in very high dilution, but for ease of control, the listed organic bromine compounds are ordinarily preferred.

The amount of organic bromine compound employed the photoisomerization reaction of this invention. Quite unexpectedly, other halogen-containing organic compounds were not found to be effective. For example, sym.-tetrachloroethane, chlorobenzene, fluorobenzene, alpha,alpha,alpha-trifluorotoluene, ethyl iodide, tetraiodophthalic anhydride and carbon tetraiodide are ineffective in causing any measurable cis to trans conversion in polybutadiene in the process of this invention even after long periods of exposure to ultra-violet irradiation.

The amount of organic bromine compounds employed and the time of exposure of the polybutadiene solution to a constant ultra-violet force will depend upon the desired degree of cis to trans conversion and the efficiency of the particular organic bromine compound employed. Ordinarily the degree of photoisomerization is directly proportional to the concentration of the organic bromine compound. The minimum and maximum effective amounts will vary with different materials and this can be determined readily by those skilled in the art with reference to the examples given hereinafter. An amount of organic bromine compound greater than about 0.01 gram per gram of polybutadiene has been found to be effective to obtain measurable photoisomerization in reasonable reaction times. Under the influence of a 1400 watt mercury resonance lamp 12 inches from the surface of the solution, under equivalent conditions, better results are ordinarily obtained with greater than about 0.05 gram of organic bromine compound per gram of polybutadiene.

The time of irradiation for a mixture containing a given organic bromine compound at a given concentration to obtain a desired degree of cis to trans conversion is directly proportional to the intensity, and inversely proportional to the square of the distance, of the ultra-violet source. With a constant source of radiation the degree of conversion ordinarily is proportional to the time of exposure with each organic bromine compound as can be determined with reference to the specific examples. Ultra-violet irradiation from any source may be employed including mercury lamps, carbon arcs and even RS Sunlamps although in the case of the latter the reaction would be slower. Irradiation in the effective wave length of ultra-violet in the range of about 1850 to 4000 Angstroms, which is readily provided by mercury resonance lamps, has been found to be quite satisfactory.

The amount and ratio of cis to trans structures in treated polybutadiene is determined readily by infra-red analysis from spectra of the irradiated samples. It is obvious that the man skilled in the art can readily determine, once it is decided what percent conversions of cis to trans conversion is desired (the ratio of cis and trans structures desired in the end product), the type and amount of organic bromine compound to use and time of exposure.

The solvent used is one in which the polybutadiene and the bromine-containing organic compound should be at least partially soluble. Preferably the solvent used is one in which the polybutadiene and bromine-containing organic compound are completely soluble for most efficient operation of the photoisomerization reaction. Any of the usual solvents for polybutadiene may be employed and aromatic hydrocarbons such as benzene and toluene, hexane, chlorobenzene, dichlorobenzene, carbon tetrachloride and the like will be found to be useful. Bromobenzene also may be used if desired. For most efficient operation of the process, the amount of polybutadiene dissolved in a given quantity of solvent is kept at a low figure. Better results are ordinarily obtained when less than about 2% solutions of polybutadiene in solvent are employed. Although solutions of higher concentrations may be used, some difficulty may be experienced with gelation which may complicate but not preclude rapid recovery of the photoisomerized polymer. Of course solutions of very low concentrations may be employed. Very efficient transformations are obtained in about 0.1 to about 1.5% solutions of polybutadiene in benzene when the polybutadiene has a molecular weight of about 250,000. The process is applicable, of course, to any polybutadiene having molecular weights lower and higher than this figure so long as it contains more than about 10% cis 1,4-structures.

The temperature at which the photoisomerization is conducted may be varied quite widely. Room temperature is quite satisfactory and although radiation by ultra-violet increases the temperature of the solution, this has no apparent adverse affect on the process. It has been found that more complete conversion from cis to trans is obtained at 5° C. than at 90° C. but the difference in degree of conversion is relative so that the temperature at which the photoisomerization is conducted may be varied from just above freezing point of the solvent to the boiling point of the solvent or even higher if the system is under pressure so that the solvent remains liquid.

It is preferred that the photoisomerization be conducted in an inert atmosphere in the absence of oxygen. When oxygen is present, dissolved either in the solvent or in the atmosphere above the solution, degradation of the polybutadiene is obtained with subsequent lowering of molecular weight. Therefore, precautions should be taken to exclude oxygen from the reaction system if it is desired that the molecular weight of the polybutadiene not be lowered. It is not essential that every trace of oxygen be removed but all reasonable and practical steps to eliminate oxygen should be taken. Of course, if it is desired or not objectionable to obtain a polymer with lower molecular weight, then small amounts of oxygen may be present for this purpose.

The container for the reaction mixture should be transparent to ultra-violet and may be Pyrex and the like but is preferably quartz. The solutions also may be exposed directly to ultra-violet radiation in suitable reactors with the radiation source directly over the surface of the solution. The process is readily adaptable to continuous and flowing film processes.

In the examples which follow, the same general experimental procedure as now set forth was employed. About 25 to 50 ml. of a 1.0 to 1.5% solution of polybutadiene in benzene is placed in a one inch diameter tube. An organic bromine compound is added to the solution. The tube is flushed with nitrogen and sealed. The tube is then placed about 12 inches from a 1400 watt mercury resonance lamp and irradiated for a period of time. At the end of the irradiation period the polymer is recovered from benzene solution by precipitation with methanol, the coagulum is washed with methanol and air dried. The recovered polymers may be compounded and vulcanized by normal rubber and plastic processing techniques. The samples in each case are analyzed for cis/trans ratio by infrared.

*Example I*

10 ml. of allyl bromide was mixed with 40 ml. of a 1.3% solution of polybutadiene in benzene. The polybutadiene had an initial cis/trans ratio of 47/53 and a molecular weight of 250,000. This solution was irradiated in a Pyrex tube for 15 hours at room temperature. The temperature of the solution during irradiation was about 50° C. The recovered polymer had a cis/trans ratio of 17/83 and unlike the original polybutadiene which was quite rubbery and soft, the photoisomerized product was tough and crystalline-like. This polymer may be molded and vulcanized with sulfur. When carefully purified, this polymer was found to be essentially bromine-free. The percent unsaturation of the polymer prior to irradiation was 440 by iodine number and 433 by iodine number after treatment, this difference being well within the experimental error of the iodine number test. The molecular weight of the polymer as determined by dilute solution viscosity was unchanged by the photoisomerization reaction, being 2.0 before and after treatment. When the above example was repeated at a temperature of 5° C., a product having a cis/trans ratio of 10/90 was obtained. When the above example is repeated at about 80°, a product having a cis/trans ratio of about 30/70 was obtained.

*Example II*

40 ml. portions of a 1.38% solution of polybutadiene rubber in benzene was placed in a quartz tube and the amounts set forth below of the listed bromine-containing organic compounds were added to the solution. The solutions were exposed to the ultra-violet radiation for the times indicated in the table. The polybutadiene had an original cis 1,4-content of about 94.2%. The degree of isomerization obtained in percent is given in the table and is determined: $(94.2 - X)$, where $X$ is the cis content of the irradiated polybutadiene at the end of the listed interval of time determined by infrared analysis. The irradiations were conducted at room temperature.

| Time irradiated, hours | 7 | 14 | 21 | 29 | 37 |
|---|---|---|---|---|---|
| | Degree of Isomerization | | | | |
| 8 ml. t-Butyl Bromide | 19.3 | 47.0 | 64.3 | 63.7 | 72.3 |
| 8 ml. Propylene Bromide | 25.6 | 50.3 | 75.6 | | 77.4 |
| 6 ml. Ethylene Bromide | 22.6 | 52.3 | 56.8 | 71.8 | 75.0 |
| 8 ml. Bromocyclohexane | 3.6 | 14.7 | 18.5 | 23.2 | 30.5 |
| 4 ml. Dibromobutane | 28.1 | 45.4 | 48.1 | 56.3 | |
| 8 ml. Bromobenzene | 3.5 | 13.4 | 16.0 | 22.6 | 27.9 |
| 8 ml. n-amyl Bromide | 7.3 | 9.9 | 16.1 | 20.1 | 23.6 |
| 6 ml. 1,2,3-tribromopropane | 22.4 | 62.1 | 73.2 | 75.4 | 78.6 |
| 6 ml. Trimethylene Bromide | 5.6 | 16.3 | 23.9 | 30.4 | 36.6 |
| 8 ml. Allyl Bromide | 22.1 | 41.4 | 47.1 | 58.9 | 62.2 |

*Example III*

40 ml. samples of a 1.04% solution of polybutadiene rubber in benzene containing varying amounts of carbon tetrabromide as set forth below were prepared and exposed at 12 inches to ultra-violet radiation from a mercury resonance lamp. The rubber had an initial cis/trans ratio of about 94.2/5.8. The percent trans 1,4-content of the samples after various times of exposure are set forth in the table below:

| Carbon Tetrabromide, grams | 0.01 | 0.05 | 0.1 | 0.3 | 0.5 |
|---|---|---|---|---|---|
| | Percent 1,4-Structures as Trans | | | | |
| Exposure, hours: | | | | | |
| 2 | [1]5.8 | [1]5.8 | [1]5.8 | 28.3 | 37.0 |
| 4 | [1]5.8 | [1]5.8 | 30.7 | 30.5 | 47.3 |
| 6 | 7.0 | 25.8 | 35.2 | 44.9 | 50.6 |
| 10 | 8.5 | 34.8 | 46.7 | 49.6 | 55.5 |
| 18 | 10.1 | 44.8 | 53.8 | 62.1 | 68.1 |

[1] Actual trans content not determined.

In each of the above examples, further increases in trans 1,4-ratio are obtained on longer exposure times to ultraviolet radiation until a product containing about 90% trans 1,4-structures is obtained.

It is obvious from the above experiments that the degree of photoisomerization obtained may be varied by time of exposure to a constant source of irradiation and by selection of the organic bromine compound. The degree of isomerization obtained at a given time and with a given organic bromine compound may be also varied by decreasing or increasing the amount of the particular organic bromine compound selected. As a further example, when the polybutadiene of Example II is dissolved in bromobenzene to the extent of 1% and this solution irradiated, a given degree of isomerization is reached 4 times faster than that obtained with concentration of bromobenzene only one-fourth as much (the remainder of the solution being benzene). In this case the rate of isomerization is directly proportional to the concentration of bromobenzene.

*Example IV*

25 ml. of a 1.25% polybutadiene solution in benzene was mixed with 5 ml. of allyl bromide. This solution was placed one inch from a 1400 watt mercury resonance lamp and while being held at a temperature of 5° C. was irradiated for 2 hours. The original polymer had a 1,4-cis to trans ratio of 47 to 53 and after exposure as described was found to have a cis to trans ratio of 10 to 90.

It will be apparent to the man skilled in the art that many modifications of the invention in addition to the embodiments set forth in the examples may be made and it is intended that the invention be limited solely by the scope of the appended claims.

I claim:

1. A method for isomerizing cis 1,4-structures in polybutadiene to trans 1,4-structures which comprises exposing to ultra-violet radiation a solution of a polybutadiene possessing more than about 10% cis 1,4-structures and an amount of an organic bromine compound having bromine attached to at least one carbon atom of said compound in amount of at least about 0.01 gram per gram of polybutadiene.

2. A method for isomerizing cis 1,4-structures in polybutadiene to trans 1,4-structures which comprises exposing to ultra-violet radiation a solution of polybutadiene possessing more than about 10% cis 1,4-structures and more than about 0.05 gram, per gram of polybutadiene, of an organic bromine compound selected from the group consisting of carbon tetrabromide, brombenzoyl bromide, bromacetyl bromide, benzoyl bromide, allyl bromide, tertiary butyl bromide, dibromobutane, ethylene bromide and 1,2,3-tribromo propane.

3. A method for isomerizing cis 1,4-structures in polybutadiene to trans 1,4-structures which comprises exposing to ultra-violet radiation a solution of a polybutadiene elastomer possessing from about 50 to about 95% cis 1,4-structures dissolved in an organic solvent of a concentration of about 1% polybutadiene in solution and more than about 0.05 gram of an organic bromine compound having bromine attached to at least one carbon atom of said compound at a temperature within the range that said solution is liquid.

4. A method for isomerizing cis 1,4-structures in polybutadiene elastomers to trans 1,4-structures which comprises exposing to ultra-violet radiation a solution of polybutadiene possessing about 90 to 95% cis 1,4-structures dissolved in benzene and at least about 0.01 gram of an organic bromine compound having bromine attached to at least one carbon atom of said compound.

References Cited in the file of this patent

Physical Reviews, v. 41 (1932), page 757.
Journal of American Chemical Society, vol. 59 (June 1937), page 1155.